United States Patent
Drego et al.

(10) Patent No.: US 11,507,382 B2
(45) Date of Patent: *Nov. 22, 2022

(54) SYSTEMS AND METHODS FOR VIRTUALLY PARTITIONING A MACHINE PERCEPTION AND DENSE ALGORITHM INTEGRATED CIRCUIT

(71) Applicant: quadric.io, Inc., Burlingame, CA (US)

(72) Inventors: Nigel Drego, Burlingame, CA (US); Aman Sikka, Burlingame, CA (US); Mrinalini Ravichandran, Burlingame, CA (US); Robert Daniel Firu, Burlingame, CA (US); Veerbhan Kheterpal, Burlingame, CA (US)

(73) Assignee: quadric.io, Inc., Burlingame, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/214,276

(22) Filed: Mar. 26, 2021

(65) Prior Publication Data

US 2021/0216696 A1 Jul. 15, 2021

Related U.S. Application Data

(63) Continuation of application No. 16/864,896, filed on May 1, 2020, now Pat. No. 10,990,410, which is a
(Continued)

(51) Int. Cl.
*G06F 9/38* (2018.01)
*G06F 15/80* (2006.01)
*G06F 9/50* (2006.01)

(52) U.S. Cl.
CPC .......... *G06F 9/3897* (2013.01); *G06F 9/5061* (2013.01); *G06F 9/5066* (2013.01);
(Continued)

(58) Field of Classification Search
CPC .. G06F 9/5066; G06F 9/5077; G06F 15/8023; G06F 9/5072; G06F 9/5061; G06F 2212/152; G06F 9/3885–3897
See application file for complete search history.

(56) References Cited

U.S. PATENT DOCUMENTS 4,939,642 A 7/1990 Blank
7,734,895 B1 6/2010 Agarwal
(Continued)

OTHER PUBLICATIONS

Gwennap et al. "Quadric's Flexible Edge Accelerator—Data-Flow Architecture Handles Neural Networks, Signal Processing" Jul. 5, 2021, Microprocessor Report, The Linley Group, 4 pages (Year: 2021).*
(Continued)

*Primary Examiner* — Keith E Vicary
(74) *Attorney, Agent, or Firm* — Padowithz Alce; Alce PLLC (57) ABSTRACT

Systems and methods for virtually partitioning an integrated circuit may include identifying dimensional attributes of a target input dataset and selecting a data partitioning scheme from a plurality of distinct data partitioning schemes for the target input dataset based on the dimensional attributes of the target dataset and architectural attributes of an integrated circuit. The methods described herein may also include disintegrating the target dataset into a plurality of distinct subsets of data based on the selected data partitioning scheme and identifying a virtual processing core partitioning scheme from a plurality of distinct processing core partitioning schemes for an architecture of the integrated circuit based on the disintegration of the target input dataset. Additionally, the architecture of the integrated circuit may be virtually partitioned into a plurality of distinct partitions of processing cores and each of the plurality of distinct
(Continued)

subsets of data may be mapped to one of the plurality of distinct partitions of processing cores.

15 Claims, 7 Drawing Sheets

Related U.S. Application Data continuation of application No. 16/747,976, filed on Jan. 21, 2020, now Pat. No. 10,691,464.

(60) Provisional application No. 62/794,198, filed on Jan. 18, 2019.

(52) U.S. Cl.
CPC .......... *G06F 9/5072* (2013.01); *G06F 9/5077* (2013.01); *G06F 15/80* (2013.01); *G06F 15/8023* (2013.01); *G06F 2212/152* (2013.01)

(56) References Cited

U.S. PATENT DOCUMENTS

| | | | |
|---|---|---|---|
| 7,774,579 | B1 | 8/2010 | Wentzlaff |
| 10,691,464 | B1 | 6/2020 | Drego |
| 10,990,410 | B2 * | 4/2021 | Drego .................. G06F 9/3897 |
| 2003/0046512 | A1 | 3/2003 | Ioki |
| 2007/0239965 | A1 | 10/2007 | Lewites |
| 2008/0134191 | A1 | 6/2008 | Warrier |
| 2008/0244222 | A1 | 10/2008 | Supalov |
| 2010/0031003 | A1 | 4/2010 | Chen |
| 2011/0057937 | A1 | 3/2011 | Wu |
| 2011/0298813 | A1 | 12/2011 | Barringer |
| 2012/0117008 | A1 | 5/2012 | Xu |
| 2014/0280372 | A1 | 9/2014 | Huras |
| 2015/0309842 | A1 | 10/2015 | Wu |
| 2018/0197269 | A1 | 7/2018 | Broadhurst |
| 2018/0276784 | A1 | 9/2018 | Varadarajan |

OTHER PUBLICATIONS

Ward-Foxton, Sally "Quadric Hybrid Architecture Takes On AI, Computer Vision" Jun. 22, 2021, EETimes, 6 total pages, https://www.eetimes.com/quadric-hybrid-architecture-takes-on-ai-computer-vision/ (Year: 2021).*

* cited by examiner

SYSTEMS AND METHODS FOR VIRTUALLY PARTITIONING A MACHINE PERCEPTION AND DENSE ALGORITHM INTEGRATED CIRCUIT

CROSS-REFERENCE TO RELATED APPLICATIONS

This application is a continuation of U.S. application Ser. No. 16/864,896, filed 1 May 2020, which is a continuation of U.S. application Ser. No. 16/747,976, filed 21 Jan. 2020, which claims the benefit of U.S. Provisional Application No. 62/794,198, filed 18 Jan. 2019, which is incorporated in its entirety by this reference.

TECHNICAL FIELD

The one or more inventions described herein relate generally to the integrated circuitry field, and more specifically to a new and useful perception and dense algorithm processing integrated circuitry architecture in the integrated circuitry field.

BACKGROUND

Modern applications of artificial intelligence and machine learning, in general, appear to be driving innovations in robotics and specifically, in technologies involving autonomous robotics and autonomous vehicles. Also, the developments in machine perception technology have enabled the abilities of many of the implementations in the autonomous robotics' and autonomous vehicles' spaces to perceive vision, perceive hearing, and perceive touch among many other capabilities that allow machines to comprehend their environments.

The underlying perception technologies applied to these autonomous implementations include a number of advanced and capable sensors that often allow for a rich capture of environments surrounding the autonomous robots and/or autonomous vehicles. However, while many of these advanced and capable sensors may enable a robust capture of the physical environments of many autonomous implementations, the underlying processing circuitry that may function to process the various sensor signal data from the sensors often lack in corresponding robust processing capabilities sufficient to allow for high performance and real-time computing of the sensor signal data.

The underlying processing circuitry often include general purpose integrated circuits including central processing units (CPUs) and graphic processing units (GPU). In many applications, GPUs are implemented rather than CPUs because GPUs are capable of executing bulky or large amounts of computations relative to CPUs. However, the architectures of most GPUs are not optimized for handling many of the complex machine learning algorithms (e.g., neural network algorithms, etc.) used in machine perception technology. For instance, the autonomous vehicle space includes multiple perception processing needs that extend beyond merely recognizing vehicles and persons. Autonomous vehicles have been implemented with advanced sensor suites that provide a fusion of sensor data that enable route or path planning for autonomous vehicles. But, modern GPUs are not constructed for handling these additional high computation tasks.

At best, to enable a GPU or similar processing circuitry to handle additional sensor processing needs including path planning, sensor fusion, and the like, additional and/or disparate circuitry may be assembled to a traditional GPU. This fragmented and piecemeal approach to handling the additional perception processing needs of robotics and autonomous machines results in a number of inefficiencies in performing computations including inefficiencies in sensor signal processing.

Accordingly, there is a need in the integrated circuitry field for an advanced integrated circuit that is capable of high performance and real-time processing and computing of routine and advanced sensor signals for enabling perception of robotics or any type or kind of perceptual machine.

The inventors of the inventions described in the present application have designed an integrated circuit architecture that allows for enhanced sensor data processing capabilities and have further discovered related methods for implementing the integrated circuit architecture for several purposes including for enabling perception of robotics and various machines.

SUMMARY OF THE INVENTION(S)

In one embodiment, a method for virtually partitioning an integrated circuit includes: identifying one or more dimensional attributes of a target input dataset; selecting a data partitioning scheme from a plurality of distinct data partitioning schemes for the target input dataset based on: the one or more dimensional attributes of the target dataset, and one or more architectural attributes of an integrated circuit; disintegrating the target dataset into a plurality of distinct subsets of data based on the selected data partitioning scheme; identifying a virtual processing core partitioning scheme from a plurality of distinct processing core partitioning schemes for an architecture of the integrated circuit based on the disintegration of the target input dataset; virtually partitioning the architecture of the integrated circuit into a plurality of distinct partitions of processing cores of the integrated circuit; and mapping each of the plurality of distinct subsets of data to one of the plurality of distinct partitions of processing cores of the integrated circuit.

In one embodiment, the integrated circuit comprises: a plurality of distinct array processing cores, each array processing core of the plurality of distinct array processing cores comprising: one or more data processing circuits; and a register file; a plurality of border cores, each border core of the plurality of border cores comprising: at least one register file.

In one embodiment, disintegrating the target dataset into a plurality of distinct subsets of data includes: setting one or more segmentation regions along a depth of the target input dataset; subdividing the target input dataset at each of the one or more segmentation regions along the depth of the target dataset.

In one embodiment, setting the one or more segmentation regions include: identifying non-interactive adjacent segments of data along the depth of the target input dataset; setting a segmentation region between the adjacent segments that do not interact.

In one embodiment, non-interactive adjacent segments of data relate to segments of data that are neighboring along the depth of the target input dataset and that can be processed independently of each other.

In one embodiment, the method includes setting the one or more segmentation regions include: identifying non-interactive nonadjacent segments of data along the depth of the target input dataset; setting a segmentation region between the nonadjacent segments that do not interact; non-interactive nonadjacent segments of data relate to segments of data that are spaced apart along the depth of the target input dataset and that can be processed by the integrated circuit independently of each other.

In one embodiment, virtually partitioning the architecture of the integrated circuit includes: defining two or more groupings of processing cores of the plurality of distinct array of processing cores; limiting an interaction between each of the two or more groupings of processing cores of the integrated circuit.

In one embodiment, limiting the interaction between the two or more groupings of processing cores of the integrated circuit includes: setting data movement instructions for each of the plurality of distinct subsets of data that restrict a movement of each respective distinct subset of data to movements within one distinct group of processing cores of the two or more groupings of processing cores of the integrated circuit.

In one embodiment, the data movement instructions for each of the plurality of distinct subsets of data define a predetermined flow of each distinct subset of data from a memory into and out of a distinct grouping of processing cores.

In one embodiment, limiting the interaction between the two or more groupings of processing cores of the integrated circuit includes: restricting a movement of data between the two or more groupings of processing cores of the integrated circuit during one or more data processing sessions.

In one embodiment, identifying the virtual processing core partitioning scheme is based at least on a number of the plurality of distinct subsets of data defined based on an application of the data partitioning scheme.

In one embodiment, if the number of the plurality of distinct subsets of data satisfies or exceed a first partitioning threshold, identifying the virtual processing core partitioning scheme includes selecting a first virtual processing core partitioning scheme.

In one embodiment, if the number of the plurality of distinct subsets of data satisfies or exceed a second partitioning threshold, identifying the virtual processing core partitioning scheme includes selecting a second virtual processing core partitioning scheme having a greater number of virtual partitions than the first virtual processing core partitioning scheme.

In one embodiment, the method includes generating one or more predicate masks for one or more subsets of data of the plurality of distinct subsets of data, wherein the one or more predicate masks indicate that one or more portions of a given subset of data entering into a processing core of a given partition of the plurality of distinct partitions of processing cores is not valid.

In one embodiment, generating the one or more predicate masks includes: evaluating a data propagation path of each of the plurality of distinct subsets of data; and identifying one or more instances in which a movement of a given subset of data of the plurality of distinct subsets of data results in an invalid movement based on the evaluation.

In one embodiment, each of the one or more predicate masks disables a processing at a given processing core of the integrated circuit of all or a portion of a given subset of data of the plurality of distinct subsets of data.

In one embodiment, each of the one or more predicate masks disables some or a part of a processing at a given processing core of the integrated circuit of all or a portion of a given subset of data of the plurality of distinct subsets of data.

In one embodiment, the method includes mapping a coefficient bus to each of the plurality of distinct partitions of processing cores of the integrated circuit.

In one embodiment, each coefficient bus is electrically connected to one distinct partition of the plurality of processing cores of the integrated circuit thereby enabling parallel transmissions of coefficients into multiple distinct partitions of the plurality of processing cores.

In one embodiment, the method includes identifying a size of the target input dataset; and assessing the size of the target input dataset against a utilization threshold of the integrated circuit, wherein if the size of the target input dataset does not satisfy the utilization threshold, automatically causing (a) the disintegration of the target input dataset and (b) the virtual partitioning of the integrated circuit.

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

I. Overview

As discussed above in the background section, the state of the art in integrated circuit architecture lacks a suitable solution for handling the multitude of perception processing tasks of robotics and autonomous machines. While GPUs may be modified with additional and/or disparate circuitry to perform some of these perception processing requirements of robotics and autonomous machines, significant gaps in a GPU's processing capabilities exist such that the resulting performance is low and not in real-time. Other perception processing circuits may exist including neural network-specific processors, computer-vision-specific processors, and the like; however, none of these provide a single comprehensive integrated circuit that is capable of processing the many disparate perception algorithms and computations needed for sensor acquisition, sensor fusion, perception processing, path planning, and the like.

Accordingly, one or more embodiments of the present application function to provide a comprehensive optimized compute platform for processing perception algorithms, perception data (e.g., sensor data and the like), and various perception processing requirements of robotics and autonomous machines. In preferred embodiments, the optimized compute platform may be implemented as a high performance and real-time processing dense algorithm processing unit (DAPU) and/or perception processing unit (PPU). In one or more implementations, the integrated circuit disclosed in the various embodiments of the present application includes an array core having a plurality of disparate processing elements and data flow and storage elements that operate to form a mesh architecture enabling the movement of data among and between many combinations of processing elements within the array core.

The mesh architecture defined by the plurality of processing elements in the array core preferably enable in-memory computing and data movement, as described in U.S. application Ser. Nos. 16/290,064 and 16/292,537 and U.S. Provisional Application Nos. 62/649,551 and 62/649,551, which are all incorporated herein in their entireties by this reference and further, enable a virtual partitioning of the array for improved computational efficiencies.

II. A System Architecture of a Dense Algorithm and/or Perception Processing Circuit (Unit)

Figure 1A:
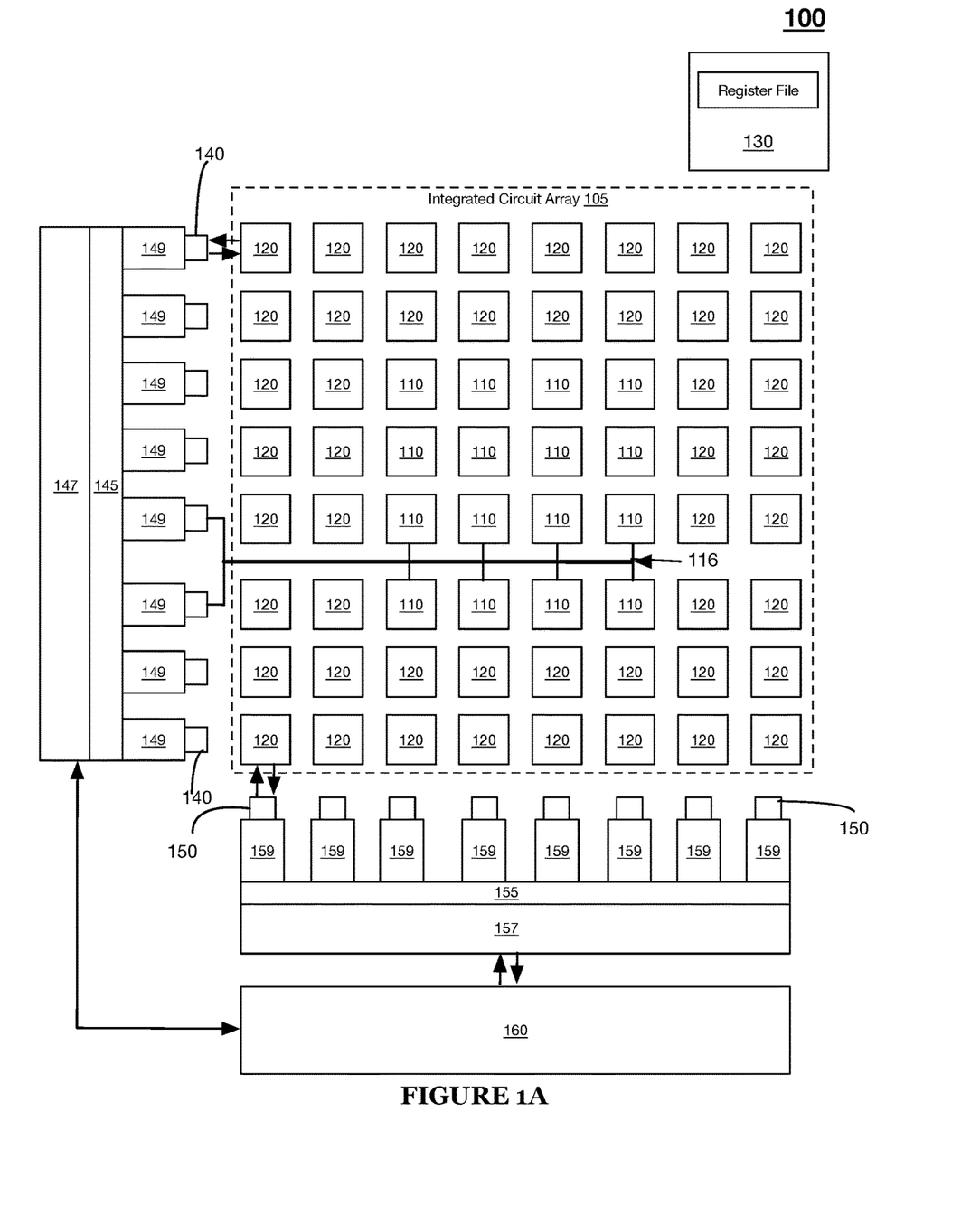
FIG. 1A illustrates a schematic of a system 100 in accordance with one or more embodiments of the present application.
Figure 1B:
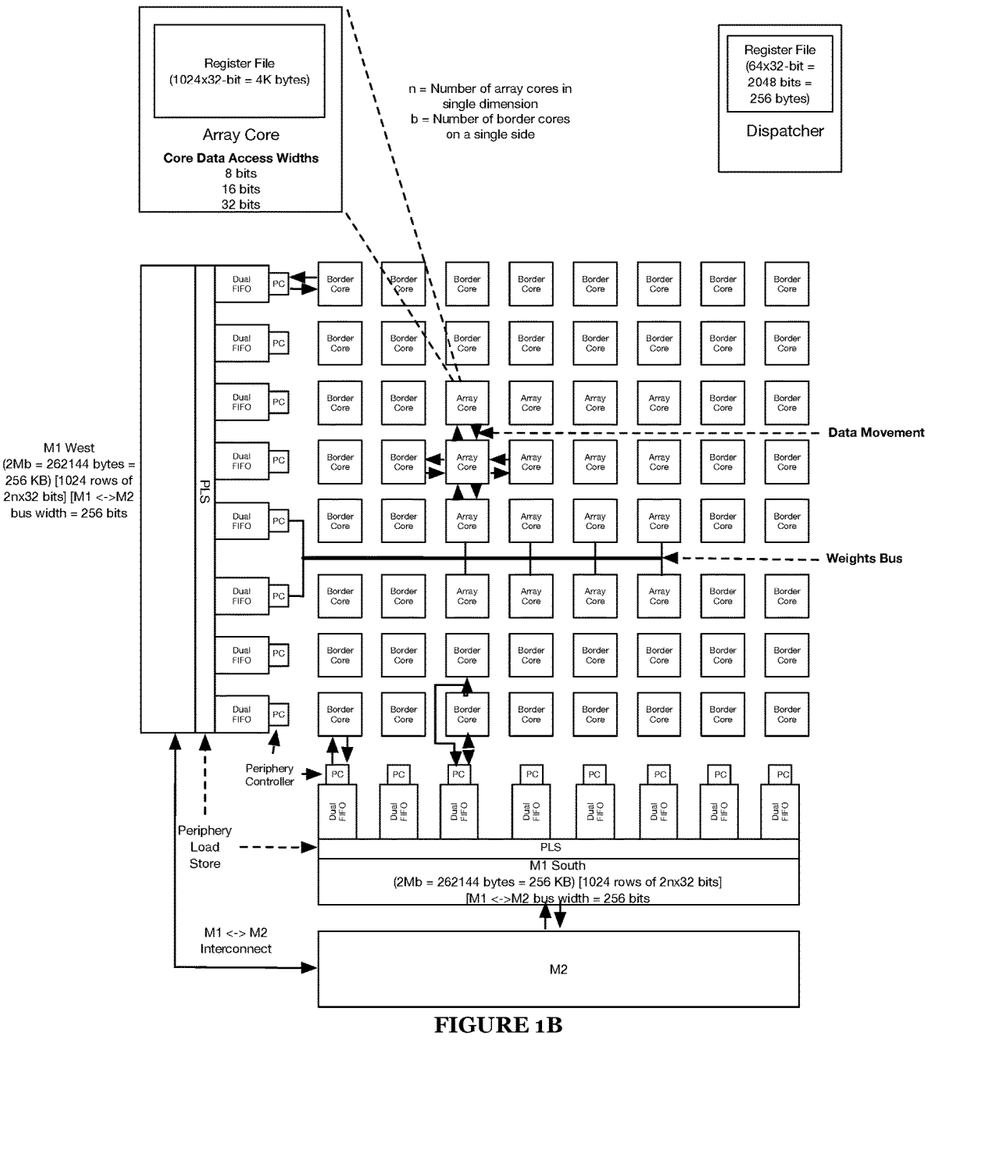
FIG. 1B illustrates an annotated schematic of a system 100 in accordance with one or more embodiments of the present application.

As shown in FIGS. 1A-1B, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159.

The integrated circuit 100 preferably functions to enable real-time and high computing efficiency of perception data and/or sensor data. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably includes a register file 112 having a large data storage capacity (e.g., 1024 kb, etc.) and an arithmetic logic unit (ALU) 118 or any suitable digital electronic circuit that performs arithmetic and bitwise operations on integer binary numbers. In a preferred embodiment, the register file 112 of an array core 110 may be the only memory element that the processing circuits of an array core 110 may have direct access to. An array core 110 may have indirect access to memory outside of the array core and/or the integrated circuit array 105 (i.e., core mesh) defined by the plurality of border cores 120 and the plurality of array cores 110.

The register file 112 of an array core 110 may be any suitable memory element or device, but preferably comprises one or more static random-access memories (SRAMs). The register file 112 may include a large number of registers, such as 1024 registers, that enables the storage of a sufficiently large data set for processing by the array core 110. Accordingly, a technical benefit achieved by an arrangement of the large register file 112 within each array core 110 is that the large register file 112 reduces a need by an array core 110 to fetch and load data into its register file 112 for processing. As a result, a number of clock cycles required by the array core 112 to push data into and pull data out of memory is significantly reduced or eliminated altogether. That is, the large register file 112 increases the efficiencies of computations performed by an array core 110 because most, if not all, of the data that the array core 110 is scheduled to process is located immediately next to the processing circuitry (e.g., one or more MACs, ALU, etc.) of the array core 110. For instance, when implementing image processing by the integrated circuit 100 or related system using a neural network algorithm(s) or application(s) (e.g., convolutional neural network algorithms or the like), the large register file 112 of an array core may function to enable a storage of all the image data required for processing an entire image. Accordingly, most or if not all layer data of a neural network implementation (or similar compute-intensive application) may be stored locally in the large register file 112 of an array core 110 with the exception of weights or coefficients of the neural network algorithm(s), in some embodiments. Accordingly, this allows for optimal utilization of the computing and/or processing elements (e.g., the one or more MACs and ALU) of an array core 110 by enabling an array core 110 to constantly churn data of the register file 112 and further, limiting the fetching and loading of data from an off-array core data source (e.g., main memory, periphery memory, etc.).

By comparison, to traverse a register file in a traditional system implemented by a GPU or the like, it is typically required that memory addresses be issued for fetching data from memory. However, in a preferred embodiment that implements the large register file 112, the (raw) input data within the register file 112 may be automatically incremented from the register file 112 and data from neighboring core(s) (e.g., array cores and/or border cores) are continuously sourced to the register file 112 to enable a continuous flow to the computing elements of the array core 110 without an express need to make a request (or issuing memory addresses) by the array core 110.

While in some embodiments of the present application, a predetermined data flow scheduled may mitigate or altogether eliminate requests for data by components within the integrated circuit array 105, in a variant of these embodiments traditional random memory access may be achieved by components of the integrated circuit array 105. That is, if an array core 110 or a border core 120 recognizes a need for a random piece of data for processing, the array core 110 and/or the border core 120 may make a specific request for data from any of the memory elements within the memory hierarchy of the integrated circuit 100.

An array core 110 may, additionally or alternatively, include a plurality of multiplier (multiply) accumulators (MACs) 114 or any suitable logic devices or digital circuits that may be capable of performing multiply and summation functions. In a preferred embodiment, each array core 110 includes four (4) MACs and each MAC 114 may be arranged at or near a specific side of a rectangular shaped array core 110, as shown by way of example in FIG. 2. While, in a preferred embodiment each of the plurality of MACs 114 of an array core 110 may be arranged near or at the respective sides of the array core 110, it shall be known that the plurality of MACs 114 may be arranged within (or possibly augmented to a periphery of an array core) the array core 110 in any suitable arrangement, pattern, position, and the like including at the respective corners of an array core 110. In a preferred embodiment, the arrangement of the plurality of MACs 114 along the sides of an array core 110 enables efficient inflow or capture of input data received from one or more of the direct neighboring cores (i.e., an adjacent neighboring core) and the computation thereof by the array core 110 of the integrated circuit 100.

Figure 2:
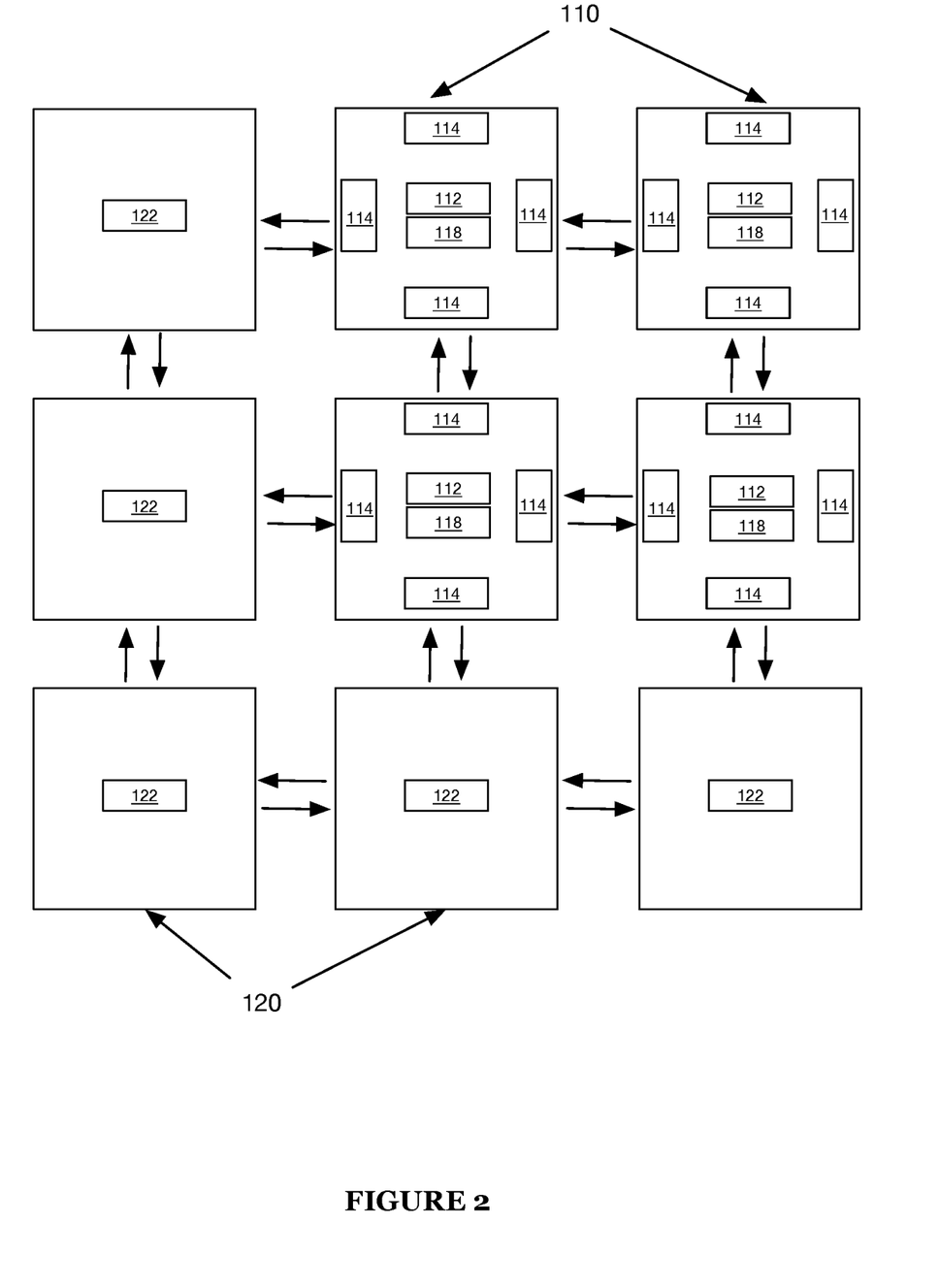
FIG. 2 illustrates a detailed schematic of a segment of the integrated circuit array 105 in accordance with one or more embodiments of the present application.

Accordingly, each of the plurality of MACs 114 positioned within an array core 110 may function to have direct communication capabilities with neighboring cores (e.g., array cores, border cores, etc.) within the integrated circuit 100. The plurality of MACs 114 may additionally function to execute computations using data (e.g., operands) sourced from the large register file 112 of an array core 110. However, the plurality of MACs 114 preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weights bus 116 may function to collect weights and coefficients data input from the one or more periphery controllers 140, 150 and transmit the weights and coefficients data input directly to one or more of the plurality of array cores 110. Accordingly, in some embodiments, multiple array cores 110 may be fed weights and/or coefficients data input via the weights bus 116 in parallel to thereby improve the speed of computation of the array cores 110.

Each array core 110 preferably functions to bi-directionally communicate with its direct neighbors. That is, in some embodiments, a respective array core 110 may be configured as a processing node having a rectangular shape and arranged such that each side of the processing node may be capable of interacting with another node (e.g., another processing node, a data storage/movement node, etc.) that is positioned next to one of the four sides or each of the faces of the array core 110. The ability of an array core 110 to bi-directionally communicate with a neighboring core along each of its sides enables the array core 110 to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file 122. The register file 122 may be configured similar to the register file 112 of an array core 110 in that the register file 122 may function to store large datasets. Preferably, each border core 120 includes a simplified architecture when compared to an array core 110. Accordingly, a border core 120 in some embodiments may not include execution capabilities and therefore, may not include multiplier-accumulators and/or an arithmetic logic unit as provided in many of the array cores 110.

In a traditional integrated circuit (e.g., a GPU or the like), when input image data (or any other suitable sensor data) is received for processing a compute-intensive application (e.g., a neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) is received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set a memory element of each of the one or more of the plurality of border cores to a default or a predetermined constant value rather than a computed value based on a computation or a data movement of a target input dataset according to instructions received at other border cores that may not be set to a default or a predetermined constant value. Additionally, or alternatively, a memory element of each of the one or more border cores 120 may be automatically set to a default or a predetermined value when it is detected that no input sensor data or the like is received with a predetermined input data flow to the integrated circuit array 105. Additionally, or alternatively, in one variation, a memory element of each of the one or more border cores 120 may be automatically set to reflect values of one or more other border cores having input sensor data when it is detected that no input sensor data or the like is received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Accordingly, such implementation may reduce clock cycles used by the plurality of array core 110 in performing computations on an input dataset.

In a preferred implementation of the integrated circuit 100, the progression of data into the plurality of array cores 110 and the plurality of border cores 120 for processing is preferably based on a predetermined data flow schedule generated at the dispatcher 130. The predetermined data flow schedule enables input data from one or more sources (e.g., sensors, other NN layers, an upstream device, etc.) to be loaded into the border cores 120 and array cores 110 without requiring an explicit request for the input data from the border cores 120 and/or array cores 110. That is, the predetermined data flow schedule enables an automatic flow of raw data from memory elements (e.g., main memory 160) of the integrated circuit 100 to the plurality of border cores 120 and the plurality of array cores 110 having capacity to accept data for processing. For instance, in the case that an array core 110 functions to process a first subset of data of a data load stored in its register file 112, once the results of the processing of the first subset of data is completed and sent out from the array core 110, the predetermined data flow schedule may function to enable an automatic flow of raw data into the array core 110 that adds to the data load at the register file 112 and replaces the first subset of data that was previously processed by the array core 110. Accordingly, in such instance, no explicit request for additional raw data for processing is required from the array core 110. Rather, the integrated circuit 100 implementing the dispatcher 130 may function to recognize that once the array core 110 has processed some amount of data sourced from its register file 112 (or elsewhere) that the array core 110 may have additional capacity to accept additional data for processing.

Figure 3A:
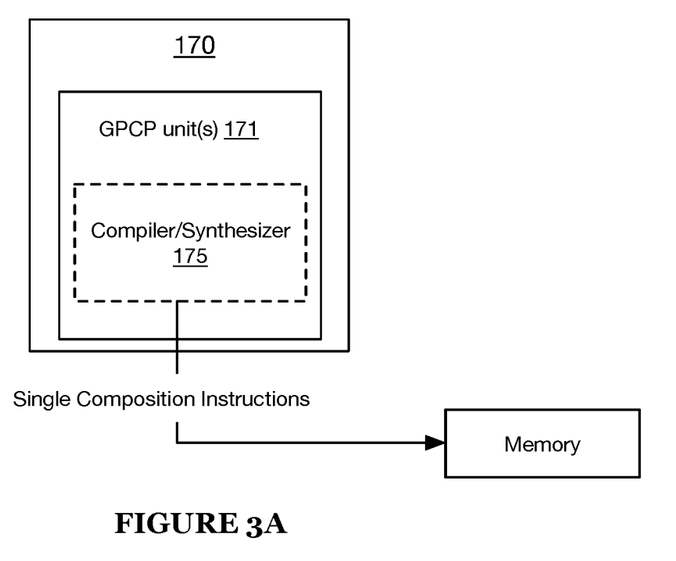
FIG. 3A illustrates a schematic of an instructions generator in accordance with one or more embodiments of the present application.

In a preferred embodiment, the integrated circuit 100 may be in operable communication with an instructions generator 170 that functions to generate computation, execution, and data movement instructions, as shown by way of example in FIG. 3A. The instructions generator 170 may be arranged off-chip relative to the components and circuitry of the integrated circuit 100. However, in alternative embodiments, the instructions generator 170 may be cooperatively integrated within the integrated circuit 100 as a distinct or integrated component of the dispatcher 130.

Preferably, the instructions generator 170 may be implemented using one or more general purpose computers (e.g., a Mac computer, Linux computer, or any suitable hardware computer) or general purpose computer processing (GPCP) units 171 that function to operate a compiler module 175 that is specifically configured to generate multiple and/or disparate types of instructions. The compiler module 175 may be implemented using any suitable compiler software (e.g., a GNU Compiler Collection (GCC), a Clang compiler, and/or any suitable open source compiler or other compiler). The compiler module 175 may function to generate at least computation instructions and execution instructions as well as data movement instructions. In a preferred embodiment, at compile time, the compiler module 175 may be executed by the one or more GPCP units 171 to generate the two or more sets of instructions computation/execution instructions and data movement instructions sequentially or in parallel. In some embodiments, the compiler module 175 may function to synthesize multiple sets of disparate instructions into a single composition instruction set that may be loaded into memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator 170 may function to load the instructions sets into a memory (e.g., memory 160 or off-chip memory associated with the instructions generator 170). In such embodiments, the dispatcher 130 may function to fetch the multiple sets of disparate instructions generated by the instructions generator 170 from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores 110.

Figure 3B:
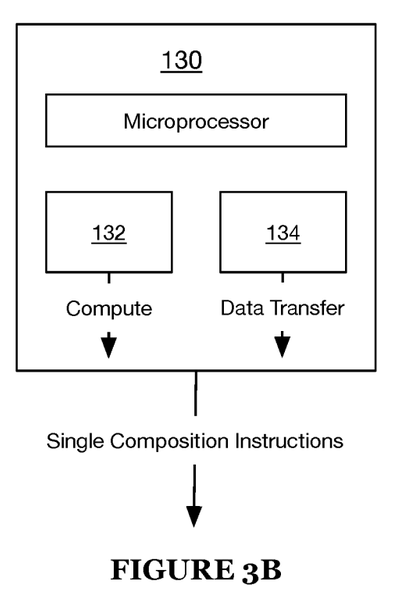
FIG. 3B illustrates a schematic of an integrated circuit controller in accordance with one or more embodiments of the present application.

As shown by way of example in FIG. 3B, in some embodiments, the processing circuitry of the dispatcher 130 includes disparate circuitry including a compute instruction generator circuit 132 and a data movement instructions generator circuit 134 (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit 134 into a single instructions composition that combines the disparate outputs.

The single instructions composition generated by the instructions generator 170 and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores 110. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit 134 are preferably separate or independent circuits, in some embodiments the compute instructions generator circuit 132 and the data movement instructions generator circuit 134 may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 is positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 is positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border core 120 along the first side of the integrated circuit array 105 to communicably and operably interface with at least one of the first periphery controllers 140 and each border core 120 along the second side of the integrated circuit array 105 to communicably and operably interface with at least one of the second periphery controllers 150.

While it is illustrated in at least FIGS. 1A-1B that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that is specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that is arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that is arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA data transfers may be triggered by a status or operation of one or more of the plurality of array cores 110. For instance, if an array core is completing or has completed a processing of first set of data, the completion or near-completion may trigger the DMA transfers to enable additional data to enter the integrated circuit array 105 for processing.

III. Method(s) for Virtually Partitioning an Integrated Circuit Array

Figure 4:
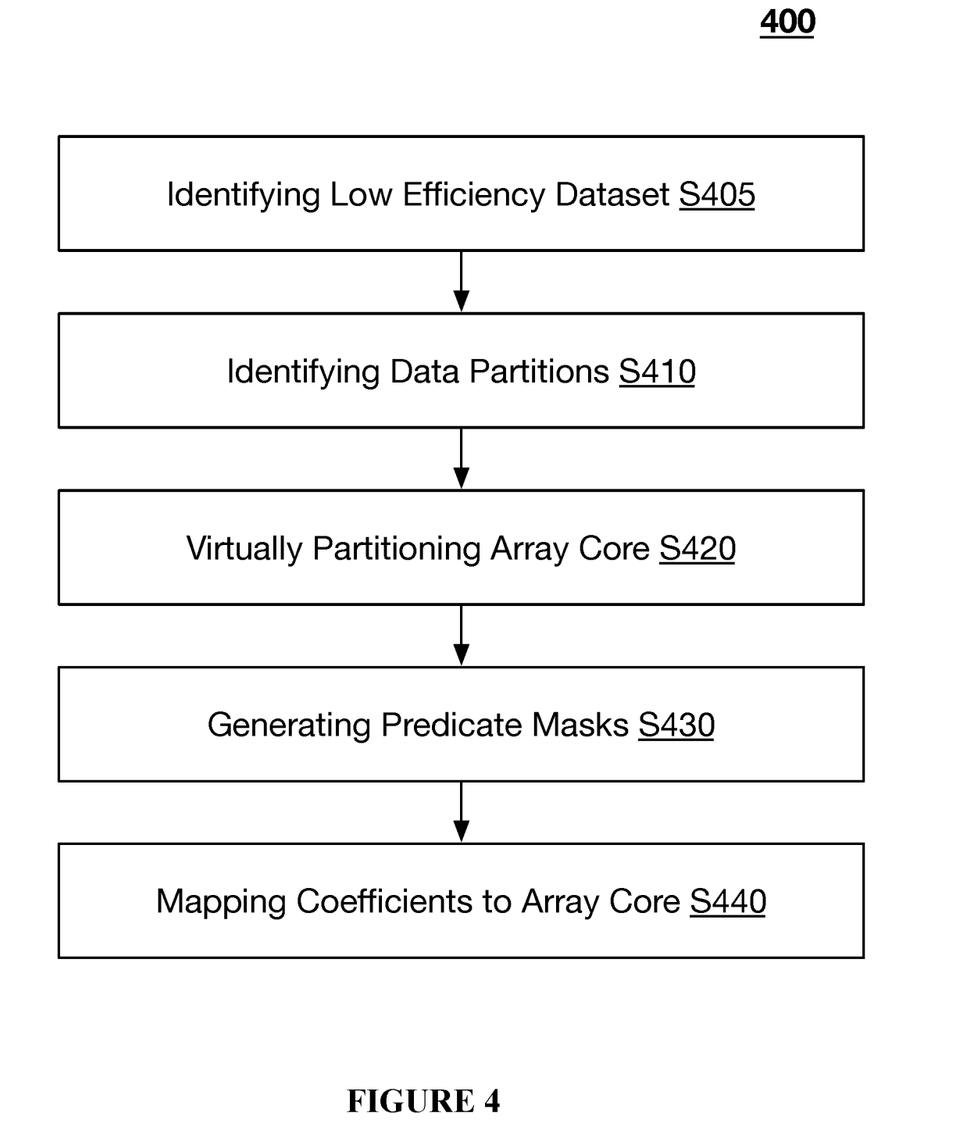
FIG. 4 illustrates a method 400 for implementing virtual partitioning in accordance with one or more embodiments of the present application.

As shown in FIG. 4, a method 400 for implementing a virtual partitioning of an integrated circuit includes identifying a dataset having low execution efficiency S405, identifying data partitions of the dataset S410, identifying an optimal virtually partitioned architecture of an array core S420, generating predicate masks S430, and mapping a coefficient bus to each virtual partition of the array core S440.

The method 400 preferably functions to optimize a utilization of integrated circuit array (array core) of an integrated circuit when input data and/or data from any suitable source, if executed upon and/or processed by the array core, would result in a gross underutilization of a processing and/or computational capacity of the array core of the integrated circuit. Accordingly, the method 400 may function to identify datasets that may underutilize array cores of an integrated circuit and function to apply a virtual partitioning and data processing technique that improves processing efficiency of the integrated circuit by dispersing the dataset among virtually partitioned sections of the array core and executing processes on the dataset in parallel or using any computationally efficient data processing technique.

4.05 Identifying Array Core Underutilization

S405, which includes identifying a dataset having low executional efficiencies, functions to identify a dataset and/or a data layer that may underutilize the processing capacity of array cores of an integrated circuit. In a preferred embodiment, S405 may function to identify datasets and/or data layers having a size that does not satisfy and/or is below a utilization threshold. In such preferred embodiment, S405 may function to determine a size of an inbound dataset or a dataset in queue for processing and evaluate the determined size of the dataset against the utilization threshold for a given array core of an integrated circuit. In the circumstance that a given dataset does not satisfy the utilization threshold, S405 may automatically trigger a virtual partitioning of the array core as well as a partitioning or dispersing of the dataset.

In a preferred embodiment, S405 may function to detect and/or identify a dataset having low executional efficiencies statically, at compile time. That is, S405 may function to assess an input dataset in an offline session prior to a live execution and/or processing of the dataset within an integrated circuit. Additionally, or alternatively, S405 may function to detect and/or identify a dataset having low executional efficiencies dynamically, at runtime. In such embodiments, S405 may function to implement a dynamic dataset assessment module or the like that evaluates input datasets in real-time.

The dataset may be any type or kind of data. For instance, the input data may include data capture by one or more external sensors that may be placed in operable communication with a system (e.g., integrated circuit 100) implementing the method 400. The data collected at the one or more sensors may include image data, acoustic data, thermal data, microwave data, and the like. It shall be noted that dataset collected at the one or more sensors may include any suitable data that is detectable (e.g., via the one or more sensors) and that may be captured by the one or more sensors, the dataset may include any data relating to the surroundings and/or circumstances surrounding a system implementing the method 400 and/or the dataset may include data collected from disparate or connected systems (e.g., another system connected via a network (mesh network or the like)) that may be provided via a communication network to a machine implementing the method 400, and/or the data may include internal/external operational data of a machine implementing the method 400.

In some implementations of S405, the dataset provided as input into an integrated circuit or system implementing the method 400 includes system-derived data that is generated as a result of a prior processing of raw data (e.g., raw sensor data) or potentially a prior processing of previously processed data. For instance, in a multi-tiered or multi-layered system that includes multiple tiers or layers of processing circuitry, raw data processed at a first processing layer of the multi-level system may be provided as input into a subsequent processing layer that may function to implement the method 400. Accordingly, the dataset received and/or collected at S405 may be sourced from a prior or upstream processing layer of a single integrated system or the like.

In yet another example, in some implementations of S405, the dataset provided as input into an integrated circuit or system implementing the method 400 includes system-derived data generated by an upstream device. The upstream device may be an on-chip device or circuit that is in operable communication with the primary processing circuits (e.g., the integrated circuit array 105). Additionally, or alternatively, the upstream device may be an off-chip device or circuit that provides data to on-chip devices or circuits that may be in operable communication with the primary processing circuits of a system implementing the method 400. In either case, the off-chip and/or the on-chip device or circuit may function to perform one or more pre-processing or storage functions of the data prior to transmitting the dataset to the primary processing circuits for processing.

4.1 Dataset Partitioning

Figure 5:
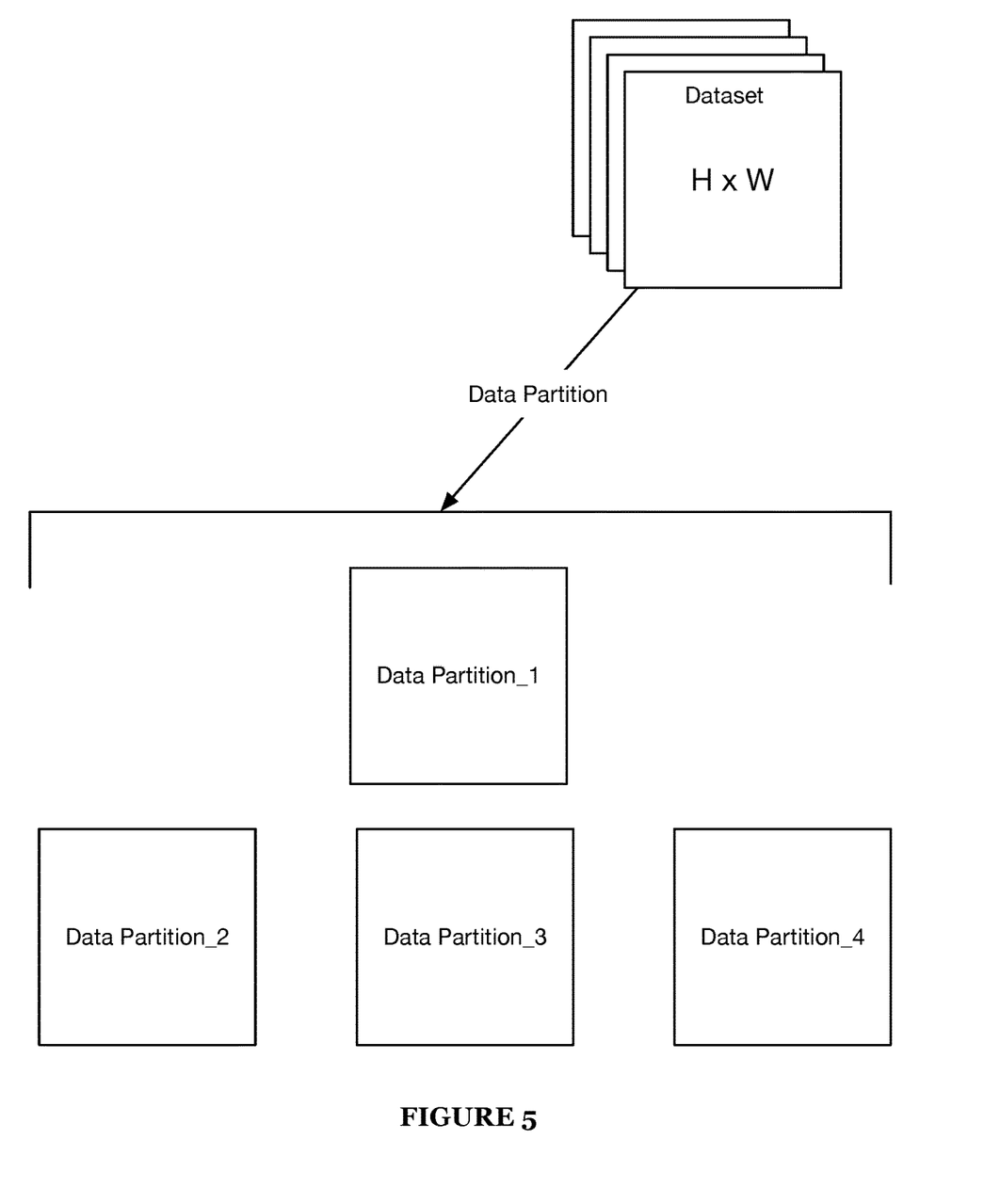
FIG. 5 illustrates a schematic of a dataset that is partitioned into distinct data subsets in accordance with one or more embodiments of the present application.

S410, which includes identifying data partitions of the dataset, may function to identify distinct or disparate data subsets from the dataset that may be processed independently (or substantially independently) from each other by the array core of the integrated circuit, as shown by way of example in FIG. 5. That is, in a preferred embodiment, S410 may function to evaluate the dataset, possibly together with an application associated with the dataset, to determine whether the dataset may be divided into segments or fragments that can be processed by the array core separately and independently.

In one or more embodiments, S410 may function to assess the one or more dimensional attributes of a given dataset to determine whether partitioning of the dataset for optimal execution may be performed. In such embodiments, S410 may function to evaluate a size and/or depth of one or more segments of a given dataset to identify whether executional efficiencies within an integrated circuit may be obtained. For instance, S410 may function to measure a size of segments of a dataset or layers of a neural network dataset or the like to determine whether a size of the layers may be optimally arranged or fitted as input into an array of processing cores of an integrated circuit. In such embodiments, if a size of the layers of the dataset is below or does not satisfy a utilization or size threshold of the integrated circuit, S410 may function to determine that the layers of the dataset may be partitioned for the entirety of the given dataset and further, determine that a virtual partitioning of the array of processing cores of the integrated circuit should be performed to a size that enables an optimal execution of the layers (and the other multiple layers) of the given dataset having the measured size. This partitioning of the given dataset may assume that each layer of the dataset is the same size, such that a virtual partitioning scheme may be the same for each layer along a depth of the dataset.

In one non-limiting example, given a 32×32 array of processing cores of an integrated circuit, S410 may function to measure a size of the layers of a target input dataset to determine whether a partitioning of the dataset and a virtual partitioning of an architecture of the integrated circuit may be performed. In such non-limiting example, if a determined size of the layers of the target input dataset is smaller than the 32×32 array and further, is below and/or does not satisfy a first partitioning threshold, S410 may function to partition the layers of the target input dataset and further, virtually partition the architecture of the integrated circuit to a smaller, more suitable size. For instance, if a size of the target input dataset is 15×15, which may fall below a 16×16 first threshold, S410 may function to virtually partition the 32×32 array of processing cores into 4 partitions of 16×16, which would allow at least 4 layers of the 15×15 target input dataset to be executed in parallel along the 4 partitions of the 16×16 virtually partitioned integrated circuit.

In another non-limiting example, a second partitioning threshold may be set at 8×8, which would cause or trigger 16 virtual partitions of 8×8 of an integrated circuit having an original size of 32×32, and a third partitioning threshold may be set at 4×4, which would allow for 64 virtual partitions of an array of processing cores of an integrated circuit having a total size of 32×32. It shall be noted that an integrated circuit may have any suitable size including, but not limited, sizes exceeding 32×32 (e.g., such as 64×64) or sizes not exceeding 32×32.

It shall also be noted that, in one or more embodiments, each layer of a multi-layer target dataset may have a different size. In such embodiments, each layer of a multi-layer target dataset may be partitioned.

Additionally, or alternatively, data partitioning which may also be referred to herein as data disintegration may preferably include demarcating portions of a segment or layer of a target dataset for subdivision. In particular, S410 may function to set one or more segmentation regions (or segmentation lines) along a depth of a target dataset. Based on the segmentation regions, S410 may function to subdivide or partition the dataset along the segmentation regions along a depth of the target dataset. Preferably, S410 may function to set the segmentation region based on identifying adjacent data portions of a target dataset that are non-interactive and that may be processed independently of each other. Preferably, two adjacent data or two distinct data portions may be considered as non-interactive if data between the two distinct data portions or groups do not have to be comingled during one or more processing steps (e.g., at runtime).

Additionally, or alternatively, in one variant, S410 may function to implement a data partitioning algorithm that operates to identify data dependencies of a dataset. In such implementation, S410 may function to execute the data partitioning algorithm, at compile time, to identify one or more data dependencies within the dataset. In a preferred embodiment, S410 implementing the data partitioning algorithm may function to identify distinct subsets or portions of the dataset that have limited to preferably no data dependencies to other data subsets. In such preferred embodiment, S410 may function to set apart the identified data subsets as independently executable data portions from the dataset.

Additionally, or alternatively, in some implementations, S410 implementing the data partitioning algorithm may function to identify distinct and/or disparate data subsets from the dataset and further, function to group together into larger data subsets those data subsets having dependencies.

4.2 Array Core Partitioning Architecture

Figure 6:
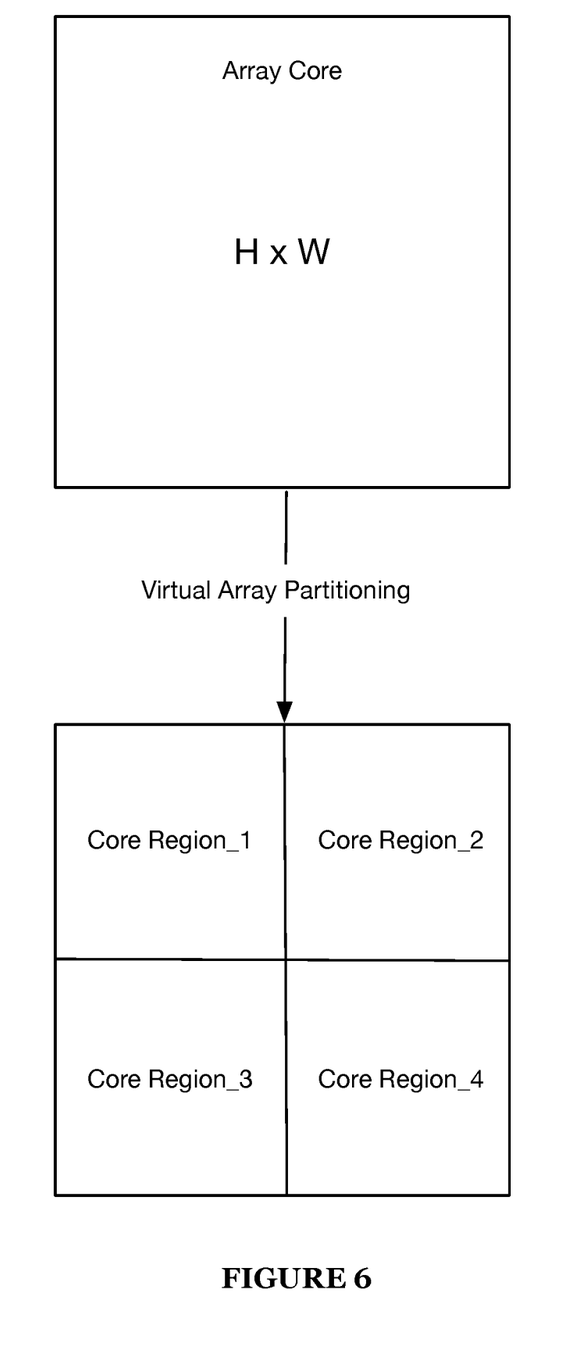
FIG. 6 illustrates a schematic of an integrated circuit array core that is virtually partitioned into distinct array core regions in accordance with one or more embodiments of the present application.

S420, which includes identifying an optimal partitioning architecture for an array core of an integrated circuit, may function to identify partitioning architecture and virtually partition an array core of an integrated circuit based on a size of the data subsets of the dataset, as shown by way of example in FIG. 6. A given array core of an integrated circuit may be partitioned into a number of different configurations. In a preferred embodiment, S420 may function to partition the array core into equal-sized partitions or segments. For instance, a single 32×32 array core that includes a total of 1024 distinct processing cores may be partitioned into four equal partitions each having 256 processing cores operating together within a partition. Similarly, the array core may be partitioned into 8, 12, 16, or any suitable sized partitions to enable parallel and/or efficient processing of the data partitions (i.e., the data subsets identified in S410).

Accordingly, in one or more embodiments, S420 may function to implement one or more of a plurality of distinct processing cores partitioning schemes, which may be selectable at least based on attributes of an target input dataset. That is, based on an assessment of target input data, preferably against one or more partitioning or utilization thresholds, S420 may function to select at least one of the distinct processing core partition schemes. Thus, each partitioning threshold and/or utilization threshold may be mapped or corresponds to one distinct processing core partitioning scheme or technique. While in several embodiments attributes relating to a size, including a width and height dimension of a segment or layer of a target dataset, typically govern or may be used as input in determining a processing core partitioning scheme, any suitable attribute including a number of input channels and/or a number of output channels may be referenced or otherwise used as inputs for determining whether a layer or segment of data may be partitioned and computational performance gains may be achieved. For instance, in the circumstances that it may be determined that a layer may be partitioned based on its size attributes, if the inputs required by a layer exceeds a given efficiency threshold, S420 may determine that a virtual partitioning of an array of processing cores of an integrated circuit may not yield computational efficiencies due to the inefficiencies in rearranging or reshaping the data for output, a downstream application, or a downstream layer. Similarly, an assessment of a number of outputs of a given layer against an efficiency threshold may be performed to additionally determine whether partitioning of the target dataset and the virtual partitioning of the integrated circuit should be performed.

In a preferred embodiment, a size of a largest data subset of a family or grouping of data subsets derived from a single dataset may govern the partitioning architecture of an array core. In such preferred embodiment, S420 may function to select and/or determine an optimal partitioning architecture by referencing an array partitioning spectrum (or continuum). The array partitioning spectrum may include multiple bands or tiers that include distinct ranges or sizes of data partitions and associated optimal partitioning architectures. For example, an array partitioning spectrum may include four distinct bands of data partitioning sizes (e.g., Band 1: 2×2 to 5×5, Band 2: 6×6 to 9×9, Band 3: 10×10 to 12×12, and Band 4: 13×13 to 15×15) where each of the four distinct bands is associated with one of a plurality of distinct partitioning architectures.

Additionally, or alternatively, it shall be known that the virtual partitioning of an architecture, including the virtual partitioning of an array of processing cores within the architecture, preferably relates to the setting of a virtual boundary within a processing region of an integrated circuit that defines or isolates a subset of processing cores of a multi-core array as a distinct group. Preferably, the virtual partition may function to confine processing of a subset of data of a larger target set of data to the distinct region within the virtual boundary. In this way, distinct subsets of processing cores of a same integrated circuit may not function to interact thereby limiting or restricting the communication of data typically between adjacent virtually bounded cores. However, it shall be noted that the virtually bounded cores do not have to be adjacent. Accordingly, a virtual partition may function to restrict a movement of data between two or more groupings of processing cores of an integrated circuit during one or more data processing sessions or the like.

4.3 Predicate Masks/Valid Bit Generation

S430, which includes generating predicate masks, may function to generate predicate masks for each of a plurality of distinct data partitions or data subsets. In a preferred embodiment, a predicate mask preferably relates to one or more sets of bits of data that may be provided to and/or stored by one or more processing cores of an array of processing cores of an integrated circuit that identify whether portions of data of a data subset entering into the one or more processing cores of the array are valid or are not valid. In a preferred embodiment, S430 may function to store or otherwise provide predicate masks to the array processing cores of an integrated circuit and preferably, to each of the distinct virtual partitions of an integrated circuit. In one or more embodiments, the predicate masks may be provided to the one or more processing cores of an array of processing cores of an integrated circuit in advance of a processing of a target input dataset and in some embodiments, may be provided (via a data bus or the like) and/or stored dynamically to the processing cores, as the target input data may be arriving or ahead of the arrival the target input dataset.

In a variant implementation, a predicate mask preferably relates to one or more sets of bits of data that may travel along with a distinct subset of data or a partition of data that identify whether portions of data of a data subset entering into a processing core of an array core is valid or is not valid. In such embodiments, the predicate masks may be augmented to each of a plurality of distinct data subsets of a target input dataset and preferably used to configure a given processing core prior to processing the corresponding distinct data subset. In such embodiments, the predicate mask data may include coordinate data of a core, position data of a core, and/or a processing core identifier for a given processing core within an integrated circuit that may inform the given processing core that the set of predicate mask data may intended to be consumed or implemented by the given processing core.

In a preferred embodiment, S430 may function to implement a mask generation algorithm to generate predicate masks for each of a plurality of distinct data partitions or data subsets. In such preferred embodiment, the mask generation algorithm may function to evaluate a data propagation path of a distinct data subset to identify one or more instances in which a movement of the data subset to a region of the array core results in an invalid movement. For each instance that the mask generation algorithm determines that a movement of the data subset into a specific region of an array core would be invalid or extraneous (e.g. causing unnecessary computing or processing work by a processing core and the like), S430 may function to use the mask generation algorithm to generate one or more predicate mask that does one of disables a processing of all or a portion of the data subset, substitutes a constant value in place of part of or all of the data subset, instructs a queue or register (e.g., a FIFO queue or the like) to not accept or reject the data subset, and/or the like. That is, a predicate mask may include a set of instructions that travel along with a given dataset that, when executed by a given processing core of an array, disables the given processing core from computing against and/or processing the associated given dataset. In one or more embodiment, a predicate mask is location specific, such that the predicate mask instructions may only be executed by one or more given processing cores of an array of processing cores based on their respective locations within the array of processing cores. In such embodiments, the predicate mask instructions may function to pass through a number of prior cores without execution and function to execute once a given subset of data, with which the predicate mask instructions travels, has arrived to an appropriately located processing core.

Additionally, or alternatively, S430 may function to generate a predicate mask for each of the plurality of distinct data partitions or data subsets based on attributes of the data subsets. For instance, in the circumstance, in which a data subset includes gaps or missing data elements (e.g., missing values or missing pixels, etc.), a predicate mask may be generated that provides constant (sometimes arbitrary) values in the place of missing data values and/or invalid data values of a data subset.

Additionally, or alternatively, a predicate mask, in some embodiments, may be generated to indicate whether or not an entirety of a data subset entering a given processing core of an array core should be processed or not. In such embodiments, a predicate mask may be generated based on attributes of an application and/or program of the system implementing the method 400.

In one implementation, S430 may function to augment each of the plurality of distinct data partitions or data subsets with a distinctly generated predicate mask such that the predicate mask propagates or travels with the distinct data subset.

In another implementation, S430 may function to program a partitioned array core with predicate mask data or instructions for each distinct data subset that is processed by the partitioned array core.

4.4 Mapping Coefficients

S440, which includes mapping a coefficient bus to each virtual partition of the array core, may function to map a coefficient (e.g., weights) bus to each of a plurality of distinct virtual partitions of an array core. Preferably, once data partitions and/or the data subsets of the dataset are determined, at compile time or statically, and assigned to distinct partition regions of the array core, S440 may function to map weights to each of the distinct partition regions of the array core such that coefficients and/or weights of an application and/or program (or algorithm) used to process the data subsets may be transported from external memory elements into each distinct partition region (or zone) to enable processing of each distinct data subset.

In a variant implementation, S440 may function to implement a dynamic routing, at runtime, of the coefficients from a plurality of coefficient buses interacting with a plurality of distinct processing regions or processing zones (i.e., virtual partitions). That is, S440 may function to route, during runtime, coefficients or weights from different sections of a bus or from distinct buses to each of the plurality of distinct virtual partitions of an integrated circuit.

In a preferred embodiment, the coefficient bus may be electrically connected and/or operably connected to each distinct virtual partition of the array core. This may enable parallel transmissions of coefficients and/or weights into each virtual partition or multiple partitions of the array core.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method for virtually partitioning an integrated circuit, the method comprising:
   identifying a virtual partitioning scheme of the integrated circuit based on:
   (i) one or more dimensional attributes of an input dataset, and
   (ii) a plurality of architectural attributes of a processing architecture of the integrated circuit;
   partitioning the input dataset into a plurality of distinct partitions of data; and
   virtually partitioning the processing architecture of the integrated circuit based on (a) identifying the virtual partitioning scheme and (b) the partitioning of the input dataset.

2. The method according to claim 1, wherein the plurality of architectural attributes include a first architectural attribute corresponding to a width dimension of at least a subset of processing cores arranged on the integrated circuit.

3. The method according to claim 1, wherein the the plurality of architectural attributes include a first architectural attribute corresponding to a length dimension of a subset of processing cores arranged on the integrated circuit.

4. The method according to claim 1, wherein the one or more dimensional attributes of the input dataset include a first dimensional attribute corresponding to a size of the input dataset.

5. The method according to claim 1, wherein identifying the virtual partitioning scheme includes:
   in accordance with a determination that a size of the input dataset is smaller than a first size threshold, identifying a first virtual partitioning scheme; and
   in accordance with a determination that the size of the input dataset is smaller than a second size threshold, identifying a second virtual partitioning scheme, different from the first virtual partitioning scheme, without identifying the first virtual partitioning scheme.

6. The method according to claim 1, wherein:
   the processing architecture of the integrated circuit includes at least one multi-core array; and
   virtually partitioning the processing architecture of the integrated circuit includes virtually partitioning the at least one multi-core array into a plurality of virtually isolated multi-core arrays.

7. The method according to claim 1, wherein the input dataset is partitioned into the plurality of distinct partitions of data based on an application associated with the input dataset.

8. The method according to claim 1, wherein partitioning the input dataset into the plurality of distinct partitions of data includes:
   setting one or more segmentation regions along a depth of the input dataset; and
   subdividing the input dataset at each of the one or more segmentation regions along the depth of the input dataset.

9. The method according to claim 8, wherein:
   setting the one or more segmentation regions along the depth of the input dataset includes setting a plurality of segmentation regions along the depth of the input dataset based on identifying a plurality of non-interactive adjacent data segments along the depth of the input dataset.

10. The method according to claim 9, wherein the plurality of non-interactive adjacent data segments indicate portions of the input dataset that are able to be independently processed.

11. The method according to claim 1, wherein the input dataset is automatically partitioned into the plurality of distinct partitions of data based on determining that a size of the input dataset does not satisfy a utilization threshold.

12. The method according to claim 1, wherein:
the virtual partitioning scheme is automatically identified based on a determination that a size of the input dataset does not satisfy a utilization threshold of the integrated circuit, and
the input dataset is automatically partitioned into the plurality of distinct partitions of data based on the determination that the size of the input dataset does not satisfy the utilization threshold of the integrated circuit.

13. The method according to claim 1, wherein the integrated circuit includes:
(1) a plurality of distinct array processing cores, including a first array processing core that includes one or more data processing circuits and a register file.

14. The method according to claim 13, wherein the integrated circuit further includes:
(2) a plurality of distinct border cores, including a first border core that includes at least one register file.

15. The method according to claim 1, wherein the integrated circuit includes a plurality of processing cores, and virtually partitioning the processing architecture of the integrated circuit includes:
virtually grouping the plurality of processing cores into a plurality of processing core groups; and
limiting communication between the plurality of processing core groups.

* * * * *